March 22, 1960

G. BLOCH 2,929,901

THERMOSTAT

Filed May 9, 1958

Inventor:
Gaston Bloch
by:
Michael S. Striker
Attorney

United States Patent Office 2,929,901
Patented Mar. 22, 1960

2,929,901

THERMOSTAT

Gaston Bloch, Zurich, Switzerland, assignor to Firma Trafag Transformatorenbau A.G., Zurich, Switzerland Application May 9, 1958, Serial No. 734,222

7 Claims. (Cl. 200—140)

According to their structure and action, the conventional thermostats are mainly subdivided into rod thermostats with a metallic rod as temperature-sensitive member, bimetallic thermostats, evaporation thermostats working in the region of the saturated vapor of a fluid, and fluid expansion thermostats utilizing the change in volume of a fluid for temperature regulation.

According to their fields of application, all the known thermostats have their advantages and disadvantages. Generally, rod thermostats are used for boilers and hot water storage, bimetallic thermostats for room temperature regulation, and evaporation or fluid expansion thermostats for regulation of industrial heating processes. This variety in design and action of the known thermostats renders their series production difficult and expensive.

The present invention originated from the idea of creating a standard thermostat suitable for practically all purposes, which always works on the same principle by employing identical and simple basic elements. At the same time, the thermostat should meet the most exacting demands as regards sensitivity and accuracy of response.

In accordance with the invention, the thermostat is characterized in that it comprises at least one metallic resilient body at least partially filled with a fluid and subject to the thermal expansion of this fluid, a small tumbler switch which forms a separate structural unit with an operating path of but a few hundredths of a millimeter, and a simple transmission lever transferring the movements of the resilient body to the tripping pin of the tumbler switch.

The accompanying drawing shows by way of example some forms of embodiment incorporating the invention.

Figure 1:
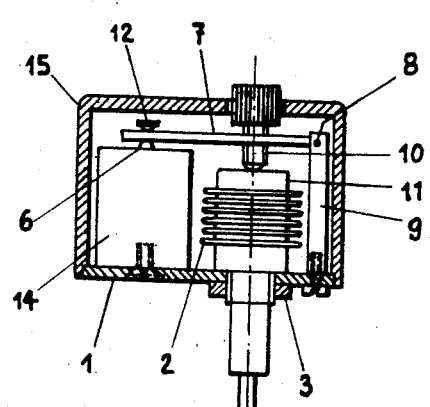
Fig. 1 is a longitudinal section of a boiler thermostat of the first form of embodiment.
Figure 2:
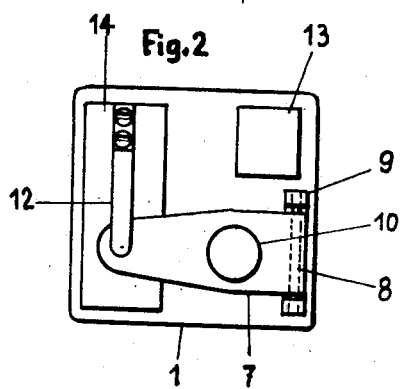
Fig. 2 is a plan view of the same thermostat.

Referring to said annexed drawing, the boiler thermostat according to Figs. 1 and 2 is constructed as follows: A metallic base plate 1 has a metallic resilient body 2 in the form of a bellows mounted thereon in usual manner by means of a threaded nut 3. This metallic bellows is connected through a capillary tube 4 to a fluid feeler 5. The length of the capillary tube 4 depends on the size of the boiler. Mounted on said base plate 1 is also a small tumbler switch 14 of common design. Such tumbler switches usually have a rupturing capacity of 10 a., 250 v. A.C. and are provided with a single-pole change-over contact. Change-over of the contact (not shown) takes place by pressing the tripping pin 6. A transmission lever 7 at one end is pivoted to an axle 8 and supported on the base plate 1 by means of a bearing support 9. Said lever 7 has screwed into it an adjusting screw 10 bearing on the upper closing piece 11 of said bellows. The other end of the lever 7 is pressed by means of a flat spring 12 against the tripping pin 6 with a pressure which is sufficient to cause the tumbler switch to change over with certainty, provided the lever 7 is not lifted off the tripping pin 6 by the pressure of the bellows 2 onto the screw 10. A terminal 13 serves to connect the thermostat electrically, and the whole assembly is closed by a cover of pressed insulating material.

The action of the thermostat according to Figs. 1 and 2 is as follows: Metallic bellows 2, feeler 5 and capillary tube 4 are filled with a fluid, say, oil, the volume of which changes linearly with the temperature in the provided temperature range. Thereby, the hollow space of the resilient bellows, except the actual folding portion, is filled with a metallic body so that the bellows itself only takes up a minimum amount of fluid. The oil volume preponderantly is contained in the feeler 5, whereby the thermostat primarily reacts to the temperature of the feeler and not to the temperature of the bellows or capillary tube. As the feeler temperature increases, the resilient bellows extends, whereby the closing piece 11 presses against the screw 10, raises the lever 7 from the tripping pin 6 and causes the switch 14 to switch off or over. If, on the other hand, the temperature falls in the feeler 5, the bellows 2 will contract, the lever 7 being thereby moved downwards under the action of the spring 12, until it presses against the tripping pin 6 and thus switches the switch on. The switching on or switching-off temperature can be set by turning the adjusting screw 10.

In the case of boiler thermostats according to Figs. 1 and 2, the feeler 5 normally is incorporated in a usual type of protective tube. The effective length of the feeler may be suited to the conditions from case to case.

Figure 3:
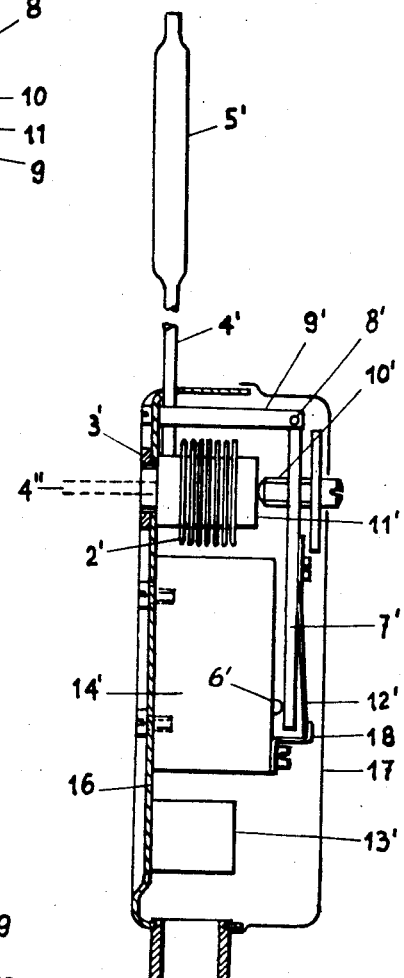
Fig. 3 is a longitudinal section through a thermostat of a second form with capillary tube for general industrial purposes.

The thermostat according to Fig. 3, on principle, is constructed of the same elements $2^I$ to $14^I$ as the boiler thermostat according to Figs. 1 and 2; only the casing 16, 17 is adapted to the purpose of application of the thermostat, and the transmission ratio of the lever $7^I$ to the tripping pin $6^I$ is chosen greater, in order to obtain higher temperature-sensitivity of the regulator. The spring $12^I$ is attached to the switch lever $7^I$ and presses against an abutment 18 mounted on the tumbler switch $14^I$. The capillary tube $4^I$ extends upwards in Fig. 3, but it may, on principle, also be directed in other directions, say, in the direction $4^{II}$.

In a room thermostat, i.e. for regulating the temperature of the room in which the thermostat is fitted, the feeler $5^I$ can normally be dispensed with. In this case the resilient bellows $2^I$ will be entirely filled with fluid so that the ambient temperature of the bellows is decisive for the temperature regulation.

As small tumbler switches 14, $14^I$, commercially available series products or specially made types may be used, the only condition being that for its operation the switch merely requires a small operating path of a few hundredths of a millimeter, which is readily possible in structures with prestressed snap-action spring of known type. The prefabricated construction with separate switch unit has moreover the advantage that the same switch may still be adopted for other purposes, say, as limit switch, control switch, etc.

Figure 4:
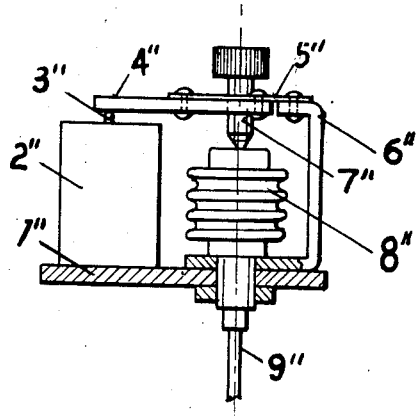
Figs. 4 and 5 are sectional views of two further forms, in which the transmission lever is resiliently mounted, and not pivotally as in Figs. 1–3.
Figure 5:
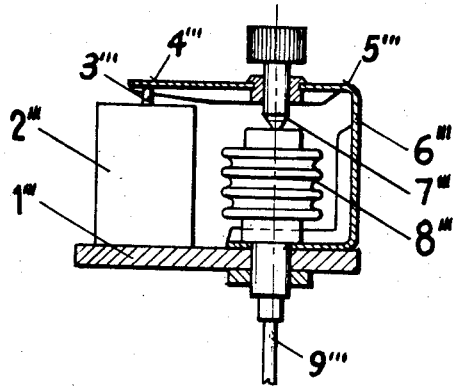

In Figs. 4 and 5, the base plates $1^{II}$ or $1^{III}$ have mounted thereon the quick-break switches $2^{II}$, $2^{III}$. The switches are actuated by tripping pins $3^{II}$, $3^{III}$ having the transmission lever $4^{II}$, $4^{III}$ bearing thereon. The lever $4^{II}$ in Fig. 4 is attached to the abutment $6^{II}$ by means of a leaf spring $5^{II}$, whereas the lever $4^{III}$ in Fig. 5 is bent and stiffened from the same sheet-iron as its abutment $6^{III}$, it being only of resilient and pliable design at the place $5^{III}$. Each of the levers $4^{II}$, $4^{III}$ has screwed therein an adjusting screw $7^{II}$, $7^{III}$ bearing on the resilient bodies $8^{II}$, $8^{III}$ fixed in the base plates $1^{II}$ and $1^{III}$ respectively. The resilient bodies $8^{II}$, $8^{III}$ are filled with fluid and communicate via capillary tubes $9^{II}$, $9^{III}$ with fluid expansion feelers (not shown).

The springing power of the leaf spring $5^{II}$ or of the bend $5^{III}$ is dimensioned and set so as to actuate the tumbler switch $2^{II}$ or $2^{III}$ with the lever $4^{II}$, $4^{III}$ pressing onto the tripping pin $3^{II}$, $3^{III}$ when the adjusting screw $7^{II}$, $7^{III}$ does not engage the resilient body $8^{II}$, $8^{III}$.

The action of the thermostat, on principle, is the same as that according to Figs. 1–3. The fluid in the capillary feeler (not shown) is subject to changes in volume in dependence on the temperature, the resilient body $8^{II}$, $8^{III}$ extending longitudinally or contracts. Movements of the resilient body will be transmitted via screw $7^{II}$, $7^{III}$ to the lever $4^{II}$, $4^{III}$ which actuates the tripping pin $3^{II}$, $3^{III}$ in dependence on the temperature at the feeler.

In contradistinction to the arrangement according to Figs. 1–3, no additional springs whatsoever are required as acting on the lever $4^{II}$, $4^{III}$. At the same time, the bearing by means of knife-edge or rotary axle, as usual with levers, is eliminated, thus resulting in an appreciable simplification of the design and a corresponding lowering of the cost of manufacture.

The sensitivity of response of the aforedescribed thermostats with temperature feelers or resilient bellows of usual size reaches values of 0.4° to 2° C. and lies therefore more favorable than in the case of simple thermostats of known designs. For boiler thermostats, on the other hand, a sensitivity of about 3° to 5° C. is deemed sufficient.

This high sensitivity, in conjunction with very great simplicity of the thermostat, is achieved by the combination of a resilient body with fluid expansion and a small tumbler switch with very short operating path. The fluid feeler supplies indeed only small expansion values, but on the other hand big switching forces, whereby a switch with relatively great switching power and small operating path may be employed while using a simple transmission lever.

It is understood that with the basic elements set forth still other thermostatic combinations are possible.

Figure 6:
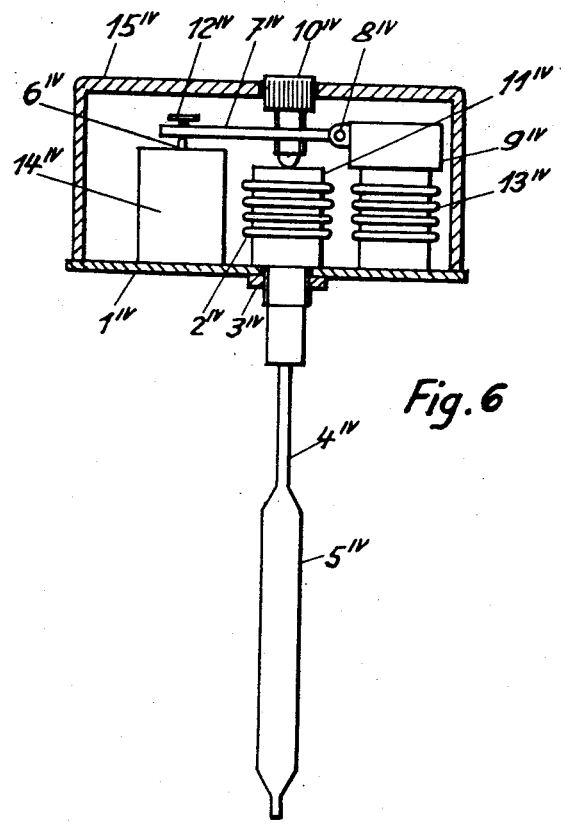
Fig. 6 shows a fifth form of a thermostat having two spring bellows.

Fig. 6 shows a further modified form of the thermostat illustrated in Fig. 1. The bearing support 9 is replaced by a closing piece $9^{IV}$ soldered to a metallic bellows $13^{IV}$. The latter is filled with the same fluid, say, oil, as the feeler $5^{IV}$, the capillary tube $4^{IV}$ and the bellows $2^{IV}$. The volume of the hollow space of the bellows $13^{IV}$ is of exactly the same size as that of the bellows $2^{IV}$.

The action of this compensating thermostat is the same as that according to Fig. 1. Since the bellows $2^{IV}$ takes up a minimum amount of fluid, any change in temperature within the head of the thermostat can influence its response value; certainly corresponding to the volume ratio between the metallic resilient body $2^{IV}$ and the feeler $5^{IV}$ to an extent that is inferior in order of magnitude than the temperature changes at the feeler $5^{IV}$. In certain cases this influencing of the desired value may cause some disturbance. The metallic resilient body $13^{IV}$ has for its duty to equalize the temperature variations within the head of the thermostat. Upon increase of the head temperature, the bellows $2^{IV}$ would expand and, without the bellows $13^{IV}$, would lift the lever $7^{IV}$ from the tripping pin $6^{IV}$, thus causing a premature switching of the thermostat. But since also the bellows $13^{IV}$ will then expand in the same sense and to the same extent, any premature lifting of the lever $7^{IV}$ from the tripping pin $6^{IV}$ will be prevented and the response value rendered purely as dependent on the temperature at the feeler $5^{IV}$.

Figure 7:
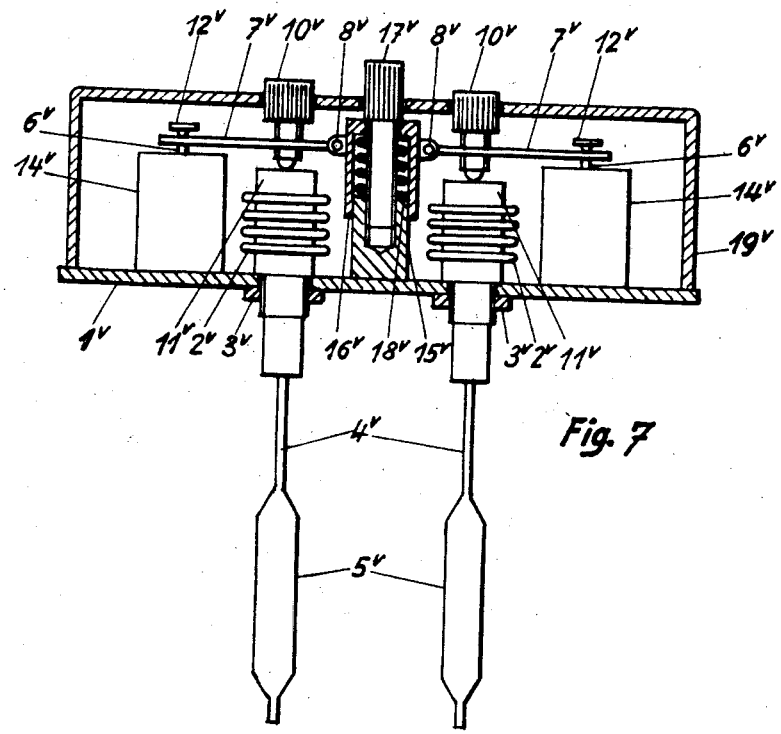
Fig. 7 shows a sixth form of a double thermostat.
Figure 8:
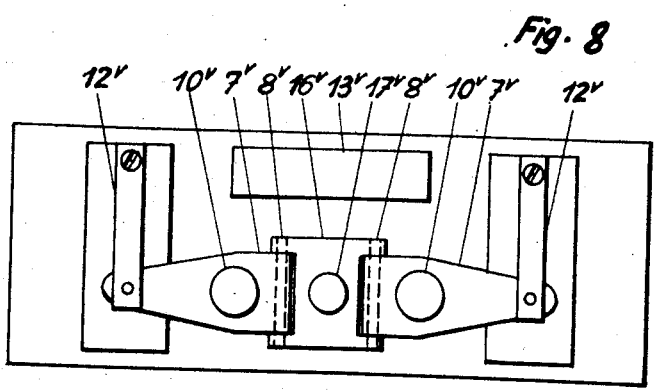
Fig. 8 is a top plan view to Fig. 7.

In the form according to Figs. 7 and 8, a metallic base plate $1^{V}$ has mounted thereon by means of threaded nuts $3^{V}$ not only one, but two resilient bodies $2^{V}$; tumbler switch $14^{V}$, transmission lever $7^{V}$, adjusting screw $10^{V}$, flat spring $12^{V}$ being likewise provided in duplicate. The axles $8^{V}$ of the two transmission levers $7^{V}$, however, are no longer stationarily arranged with respect to the base plate $1^{V}$, but held in common on a substantially U-shaped carrier $16^{V}$. This carrier $16^{V}$ is guided on a block $15^{V}$ and can be displaced at right angles to the base plate $1^{V}$. Said carrier can be displaced by turning the screw $17^{V}$ which can be screwed more or less deep into a thread of the block $15^{V}$. A coil spring $18^{V}$ ensures that said carrier will always be pressed against the head of the screw $17^{V}$ and follow its up and down movements.

The action of the double thermostat according to Figs. 7 and 8 is as follows: Both thermostats operate individually as described with reference to Figs. 1–3. The switch-on or switch-off temperature may be set individually for each thermostat by turning the adjusting screw $10^{V}$. In this way it is possible to have one thermostat set to a certain desired higher value than the other. By turning the central regulating screw $17^{V}$ both thermostats are adjustable so as to change in both the switch-on and switch-off temperature while retaining the temperature difference previously set.

Figure 9:
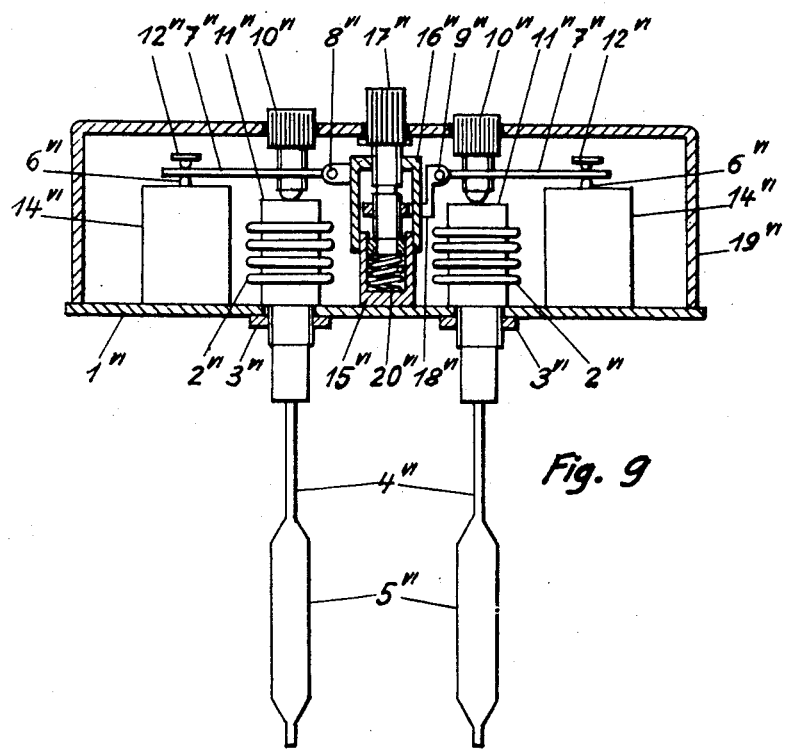
Fig. 9 is a seventh form of another double thermostat.
Figure 10:
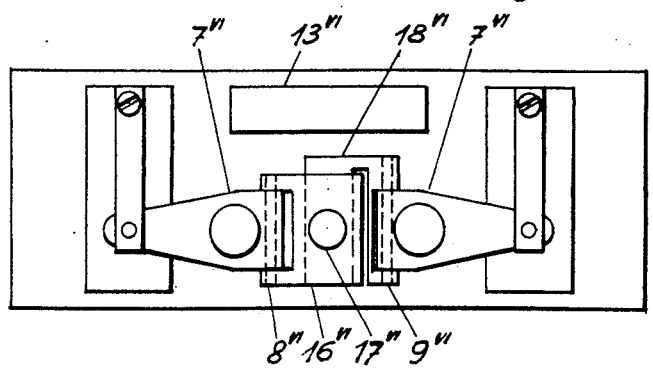
Fig. 10 is a top plan view to Fig. 9.

The double thermostat according to Figs. 9 and 10 is constructed as follows: Two thermostats are mounted on a base plate $1^{VI}$, together with two resilient bodies $2^{VI}$ mounted by means of threaded nuts $3^{VI}$; tumbler switch $14^{VI}$, transmission lever $7^{VI}$, adjusting screw $10^{VI}$ are likewise provided in duplicate. The axles $8^{VI}$ and $9^{VI}$ of the two transmission levers $7^{VI}$ are not stationarily mounted with respect to the base plate, but arranged on two carriers $16^{VI}$ and $18^{VI}$ which are displaceable at right angles to said base plate, the carrier $16^{VI}$ being guided on the block, and the carrier $18^{VI}$ on carrier $16^{VI}$. The up and down movements of these two carriers are controlled by a screw $17^{VI}$, which is guided in a cylindrical bore in the block $15^{VI}$ and in the cover $19^{VI}$. The spring $20^{VI}$ ensures that the screw $17^{VI}$ lies on the cover $19^{VI}$, to be thus kept in a fixed position with respect to the base plate $1^{VI}$. The screw $17^{VI}$ has two threads of different pitches. One thread has its nut thread within carrier $16^{VI}$, and the other within carrier $18^{VI}$. By turning the screw $17^{VI}$ the vertical positions of the carriers $16^{VI}$ and $18^{VI}$ will change relative to the base plate in accordance with the two pitches.

The action of the double thermostat according to Figs. 9 and 10 is as follows: Both thermostats operate individually as described with reference to Figs. 1–3. The switch-on and switch-off temperatures may be set individually by turning the regulating screw $10^{VI}$. In this way it is possible to have one thermostat set to a desired higher percentage value than the other. By turning the regulating screw $17^{VI}$ both thermostats may be so adjusted as to simultaneously change in both the switch-on and switch-off temperatures while maintaining a similar percentage difference. According to the selection of the ratio of the pitches of the screw $17^{VI}$, the desired fixed percentage value can be chosen. In accordance with this value, also the first setting of both thermostats with the regulating screws $10^{VI}$ must be made.

Although certain preferred embodiments of the present invention have been described, it is readily apparent to one skilled in the art that other modifications can be

What I claim is:

1. A thermostat, comprising, in combination, a support casing; a resilient bellows mounted in said support casing; a hollow feeler member located outside said support casing; capillary tube means connecting said feeler member to said bellows; a further resilient bellows substantially identical with said bellows mounted in said casing; a liquid filling said feeler member, said tube means, said bellows and said further bellows and arranged to move said bellows in response to the thermal expansion and contraction thereof; a lever member pivotally mounted on said further bellows and extending over said bellows, said lever member having a threaded bore opposite said bellows; switch means mounted in said support casing; spring means mounted in said support casing and urging said lever member against said switch means; threaded spacing means mounted in said bore of said lever member and having an end portion spaced from said bellows at an adjustable distance, whereby said bellows will engage said spacing means to turn said lever member against the bias of said spring means away from said switch means for actuating the same when said bellows moves in response to the expansion of said fluid and whereby the movement of said bellows is partly compensated by the movement of said further bellows.

2. A thermostat comprising, in combination, a support member; a first resilient bellows mounted on said support member; a hollow feeler member located outside said support member; tube means connecting said feeler members to said first bellows, to form an interconnected first bellows assembly; a second resilient bellows mounted on said casing; a fluid filling the said second bellows and filling said first bellows assembly, said liquid being arranged to move said first and second bellows in response to the thermal expansion and contraction thereof; a lever member pivotally mounted on said second bellows and extending over said first bellows, said lever member including threaded bore opposite said first bellows; switch means mounted on said support member; spring means mounted on said support member and urging said lever member against said switch means; threaded spacing means mounted in said bore of said lever member and having an end portion spaced from said first bellows at an adjustable distance, whereby said bellows will engage said spacing means to turn said lever member against the bias of said spring means away from said switch means for actuating the same when said bellows move in response to the expansion of said fluid in said first bellows assembly, and whereby the movement of said first bellows is partly compensated by the movement of said second bellows due to the thermal expansion of said fluid therein.

3. A thermostat comprising, in combination, a support member; a plurality of resilient bellows mounted on said support member; a plurality of hollow feeler members located outside said support member; capillary tube means connecting one of said bellows with one of said hollow feeler members to form a plurality of interconnected bellows assemblies; a liquid filling each of said bellows assemblies; a plurality of lever means pivotally supported on said support member, one of said levers extending over one of said bellows at a selected distance, said lever means including each a threaded bore opposite one of said bellows; a plurality of switch means mounted on said support member, one switch means associated with one of said bellows assemblies; spring means mounted on said support member and urging said lever members against said switch means; threaded spacing means mounted in said bore of each of said levers and have an end portion spaced from each of said bellows at an adjustable distance, whereby said bellows will selectively engage said spacing means to turn one of said lever members against the bias of said spring means away from said switch means for actuating the same when said bellows move in response to the expansion of said fluid.

4. A thermostat comprising, in combination, a support member; a plurality of resilient bellows mounted on said support member; a plurality of hollow feeler members located outside said support member; capillary tube means connecting one of said bellows with one of said hollow feeler members to form a plurality of interconnected bellows assemblies; a support element mounted on said support member and extending longitudinally of said bellows; means mounted on said support member for selectively adjusting the position of said support element longitudinally of said bellows; a plurality of lever means pivotally supported on said support element, one of said levers extending over one of said bellows at a selected distance, said lever means including each a threaded bore opposite one of said bellows; a plurality of switch means mounted on said support member, one switch means associated with one of said bellows assemblies; spring means mounted on said support member and urging said lever members against said switch means; threaded spacing means mounted in said bores of each of said levers and having an end portion spaced from each of said bellows at an adjustable distance, whereby said bellows will selectively engage said spacing means to turn one of said lever members against the bias of said spring means away from said switch means for actuating the same when said bellows move in response to the expansion of said fluid, and whereby said distance between said levers on said bellows can be adjusted.

5. A thermostat comprising, in combination, a support member; a first resilient bellows mounted on said support member; a first hollow feeler member located outside said support member; first tube means connecting said first bellows with said first feeler member to form a first interconnected bellows assembly; a second resilient bellows mounted on said support member; a second hollow feeler member located outside said support member; second tube means connecting said second bellows with said second feeler member to form a second interconnected bellows assembly; a liquid filling said first bellows assembly and said second bellows assembly; first switch means mounted on said support member and co-operating with said first bellows assembly; second switch means mounted on said support member and cooperating with said second bellows assembly; a support element mounted on said support member and extending longitudinally of said first and said second bellows; means mounted on said support member for selectively adjusting the position of said support element longitudinally of said bellows; first lever means pivotally supported on said support element and extending over said first bellows at a selected distance and including a threaded bore opposite said first bellows; second lever means pivotally supported on said support element and extending over said second bellows at a selected distance and including a threaded bore opposite said second bellows; first threaded spacing means mounted in said bore of said first lever means and having an end portion spaced from said first bellows at an adjustable distance; second threaded spacing means mounted in said bore of said second lever means and having an end portion spaced from said second bellows at an adjustable distance; spring means mounted on said support member and urging said first lever member and said second lever member against said first switch means and said second switch means, respectively, whereby said means can be actuated to alter the distance between said first levers and said first bellows and between said second lever means and said second bellows, and whereby said bellows will selectively engage said spacing means to turn said first and said second lever members against the bias of said spring means away from said first and second switch means, respectively, for actuating the same when said first and second bellows move in response to the expansion of said fluid.

6. A thermostat comprising, in combination, a support member; a first resilient bellows mounted on said support member; a first hollow feeler member located outside said support member; first tube means connecting said first bellows with said first feeler member to form a first interconnected bellows assembly; a second resilient bellows mounted on said support member; a second hollow feeler member located outside said support member; second tube means connecting second bellows with said second feeler member to form a second interconnected bellows assembly; a liquid filling said first bellows assembly and said second bellows assembly; first switch means mounted on said support member and cooperating with said first bellows assembly; second switch means mounted on said support member and cooperating with said second bellows assembly; a support element mounted on said support member and extending longitudinally of said first and said second bellows and including a first pivot means and a second pivot means; means mounted on said support member for selectively adjusting the position of said support element longitudinally of said bellows; first lever means pivotally supported on said first pivot means of said support element and extending over said first bellows at a selected distance and including a threaded bore opposite said first bellows; second lever means pivotally supported on said second pivot means of said support element and extending over said second bellows at a selected distance and including a threaded bore opposite said second bellows; first threaded spacing means mounted in said bore of said first lever means and having an end portion spaced from said first bellows at an adjustable distance; second threaded spacing means mounted in said bore of said second lever means and having an end portion spaced from said second bellows at an adjustable distance; spring means mounted on said support member and urging said first lever member and said second lever member against said first switch means and said second switch means, respectively, whereby said means can be actuated to alter the distance between said first levers and said first bellows and between said second lever means and said second bellows, and whereby said bellows will selectively engage said spacing means to turn said first and said second lever members against the bias of said spring means away from said first and second switch means, respectively, for actuating the same when said first and second bellows move in response to the expansion of said fluid.

7. A thermostat comprising, in combination, a support member; a first resilient bellows mounted on said support member; a first hollow feeler member located outside said support member; first tube means connecting said first bellows with said first feeler member to form a first interconnected bellows assembly; a second resilient bellows mounted on said support member; a second hollow feeler member located outside said support member; second tube means connecting said second bellows with said second feeler member to form a second interconnected bellows assembly; a liquid filling said first bellows assembly and said second bellows assembly; first switch means mounted on said support member and cooperating with said first bellows assembly; second switch means mounted on said support member and cooperating with said second bellows assembly; a support element mounted on said support member and extending longitudinally of said first and said second bellows and including a first pivot means and a second pivot means; means mounted on said support member for differentially adjusting the position of said first and second pivot means longitudinally of said bellows; first lever means pivotally supported on said first pivot means of said support element and extending over said first bellows at a selected distance and including a threaded bore opposite said first bellows; second lever means pivotally supported on said second pivot means of said support element and extending over said second bellows at a selected distance and including a threaded bore opposite said second bellows; first threaded spacing means mounted in said bore of said first lever means and having an end portion spaced from said first bellows at an adjustable distance; second threaded spacing means mounted in said bore of said second lever means and having an end portion spaced from said second bellows at an adjustable distance; spring means mounted on said support member and urging said first lever member and said second lever member against said first switch means and said second switch means, respectively, whereby said means can be actuated to alter the distance between said first levers and said first bellows and between said second lever means and said second bellows, and whereby said bellows will selectively engage said spacing means to turn said first and said second lever members against the bias of said spring means away from said first and second switch means, respectively, for actuating the same when said first and second bellows move in response to the expansion of said fluid.

References Cited in the file of this patent
UNITED STATES PATENTS

| | | |
|---|---|---|
| 2,274,329 | Hammond | Feb. 24, 1942 |
| 2,355,975 | Henrici | Aug. 15, 1944 |
| 2,727,115 | Visser et al. | Dec. 13, 1955 |
| 2,758,178 | Eskin | Aug. 7, 1956 |
| 2,792,475 | Sweger | May 14, 1957 |
| 2,828,373 | Sweger | Mar. 25, 1958 |